United States Patent [19]
Chan et al.

[11] Patent Number: 5,500,050
[45] Date of Patent: Mar. 19, 1996

[54] RATIO FEED DETERGENT CONTROLLER AND METHOD WITH AUTOMATIC FEED RATE LEARNING CAPABILITY

[75] Inventors: Wai Y. C. Chan; James W. Livingston, both of Santa Cruz, Calif.

[73] Assignee: Diversey Corporation, Ontario, Canada

[21] Appl. No.: 276,088

[22] Filed: Jul. 15, 1994

[51] Int. Cl.⁶ .................................................. B08B 13/00
[52] U.S. Cl. ..................... 134/18; 134/56 D; 134/57 D; 134/58 D; 137/897
[58] Field of Search ............................... 134/56 D, 57 D, 134/58 D, 95.1, 18, 26; 68/17 R, 207; 222/651, 652, 282, 283; 137/624.18, 897

[56] References Cited

U.S. PATENT DOCUMENTS

| | | | |
|---|---|---|---|
| 3,160,317 | 12/1964 | Hambre . | |
| 4,524,801 | 6/1985 | Magnasco et al. . | |
| 4,540,921 | 9/1985 | Boyd, Jr. et al. | 68/12.19 |
| 4,691,850 | 9/1987 | Kirschman et al. | 222/642 |
| 5,014,211 | 5/1991 | Turner et al. | 68/17 R |
| 5,253,494 | 10/1993 | Frucco et al. | 68/17 R |
| 5,435,157 | 7/1995 | Laughlin | 68/17 R |

*Primary Examiner*—Frankie L. Stinson
*Attorney, Agent, or Firm*—Flehr, Hohbach, Test, Albritton & Herbert

[57] ABSTRACT

A detergent dispenser controller for use with a washing device, such as a dishwasher, that measures detergent concentration in a water tank by measuring the conductivity of the detergent solution in the water tank. The detergent controller automatically learns the feed rate of the detergent dispenser used, regardless of the type of detergent dispenser being used. For each detergent feed cycle, the controller computes a Feed Factor equal to the amount of detergent feed on time required for each unit increase in the detergent concentration, which is the inverse of the detergent feed rate. The controller stores the computed Feed Factor for the last N feed cycles in a non-volatile memory, and computes a running average of the N feed factors stored in the non-volatile memory. Whenever the detergent dispenser is powered on, it determines the difference between the measured wash tank detergent concentration and a specified detergent concentration set point value. The computed average feed factor and the difference between the set point and the current detergent concentration are multiplied to compute a detergent feed on time. The detergent dispenser is then turned on for the computed feed on time, and after a suitable subsequent mixing period, the change in detergent concentration during the last feed cycle is determined and a new Feed Factor is computed and stored. The detergent concentration is preferably measured using logarithmic measurement units, and separate Feed Factors may be computed and used for at least two detergent concentration ranges.

32 Claims, 8 Drawing Sheets

RAM
┌161

| | |
|---|---|
| Current Concentration | Low Detergent flag |
| Buff (Old Concentration) | Solenoid On flag |
| SetPoint | InBlastZone flag |
| Mixing Time | BlastZoneDone flag |
| Detergent On Time | Mixing flag |
| Solenoid Feed Time | Store flag |
| Diff | 1stFeedDone flag |
| FF | ⋮ |
| FFactor | |
| LowDetergentCounts | |
| A | |
| B | |
| X1 | |
| X2 | |
| X3 | |
| X4 | |
| Y1 | |
| Y2 | |
| Y3 | |
| Y4 | |
| X_Ave | |
| Y_Ave | |

Parameters copied to Nonvolatile Memory { (LowDetergentCounts through Y4)

FIGURE 3

RATIO FEED DETERGENT CONTROLLER AND METHOD WITH AUTOMATIC FEED RATE LEARNING CAPABILITY

The present invention relates generally to chemical dispensers for dispensing liquid, powder, solid and slurry type chemicals, and particularly to a general purpose chemical dispenser controller that automatically learns the chemical feed rate of whatever chemical dispenser is it coupled to and then uses that learned feed rate information to dispense chemicals so as to reach a specified concentration or quantity dispensing target quickly without overshooting the specified target.

BACKGROUND OF THE INVENTION

In a commercial dishwasher there is a requirement to automatically control the addition of detergent into the dishwasher's wash tank. Starting with fresh water, the controller must control the detergent dispenser in such a way that it dispenses detergent to the-desired concentration (called the Set Point) for the dishwashing process. Further, the controller must cause the dispenser to add additional detergent as the dishwashing process runs due to dilution of the detergent concentration caused mainly by the flow of the fresh water used in the rinsing process into the wash tank. A conductivity cell located in the wash tank is commonly used to sense the detergent concentration and to send a feedback signal to the controller. The present invention pertains to controllers using such a feedback sensor.

Typically the entire control system derives its power from a transformer connected in parallel with the dishwasher's wash pump. The transformer converts the dishwasher's higher voltage (typically 115 v.a.c. to 240 v.a.c.) down to the controller's operating voltage of 24 v.a.c. In most commercial dishwashing systems, the chemical dispenser's controller only receives power when the dishwasher's wash pump is operating. This has several advantages and is the commonly accepted method of deriving power for the detergent dispenser and the dispenser's controller. The benefits are that it provides an interlock so that no detergent can be dispensed if the wash tank is not full of water (there is a wash tank sensor in most machines that prevents the wash pump from running on a empty tank) and being agitated. Using the same connection to perform the wash pump interlock function as well as to provide power to operate the controller keeps the installation as simple as possible, which is very important with this type of equipment.

The present invention addresses the problem of controlling detergent concentration closely about the desired set point with little overshoot or undershoot. It further addresses the problem associated with field set-up of the current controllers to avoid excessive overshoot, especially when dispensing a detergent that is either slow to mix with the wash tank water or exhibits wide variations in its feed rate over time.

Typical dispensers used for dosing detergent into commercial dishwashers do not allow true proportional control of the feed rate because they employ a simple ON/OFF type solenoid valve which controls the flow of water to a nozzle. The spray from the nozzle is directed at the detergent which is typically either in powder, tablet or "brick" form. The sprayed water then dissolves some of the detergent or simply carries the undissolved detergent along with the sprayed water as it falls, due the gravity, down the dispenser's feed tube and into the dishwasher's wash tank.

There are several problems associated with controlling such a dispenser. The controller receives its feedback signal from a conductivity cell located in the wash tank that can only measure detergent that has dissolved into the wash tank water. The dissolution time of detergents varies due to several factors: chemical composition, dispenser spray water temperature, water pressure, wash tank temperature and wash tank agitation. Further, the controller can not measure the amount of detergent that is in the feed line connecting the dispenser to the wash tank and somehow this must be taken into account to allow good control.

It should be noted that if a simple control function is used that allows the solenoid to remain ON until the set point conductivity is sensed in the tank, the end detergent concentration will typically overshoot the required amount by 50% or more. A 50% overshoot on the initial charging of the wash tank will result in approximately 25% more detergent being used over the course of the typical length dishwasher operation between wash tank refills than would be used if there were no overshoot.

RADIO FEED CONTROL

In order to avoid the over usage of detergent, the prior art has resorted to "ratio feed" control of the solenoid valve, where the solenoid valve is turned ON and OFF as the concentration nears set point. This produces two effects that tend to reduce the over usage that occurs with the simple control function explained above. First it reduces the effective flow rate somewhat because of the reduced duty cycle, and second it allows extra time for the feed tube to clear and the detergent to become mixed in the wash tank. Typical duty cycle rates are 1 to 10 seconds ON and 1 to 10 seconds OFF. The more advanced controllers only enter this "ratio feed" control function when the concentration is between −1% and −30% of the desired concentration. Note that if this limited feed rate were used to dispense all the detergent needed after a wash tank drain and refill, the time to reach the set point detergent concentration would be much too long. In addition, for best control, the On/Off feed ratio must be set after the dispenser and control system are installed and the dishwasher has been allowed to operate for a while (typically 5 minutes or more). This amounts to individually tuning each dispensing system after installation and is time consuming and error prone.

Because the "ratio feed" method cannot be used effectively to control the charging of a newly refilled wash tank with detergent, the prior art simply resorts to the basic control function when the concentration is below about 30% of the detergent concentration set point. This usually produces a large overshoot of set-point on the "initial charge" cycle. Since this only takes place 1 to 3 times per day in a typical installation, the industry has learned to live with "initial charge" overshoot.

Another problem associated with the prior art "ratio feed" detergent dispensing methodology is that after being adjusted during set-up, changes in feed rate or mixing rate may occur, and therefore the "ratio feed" setting will no longer be optimal. This may result in either excessive overshoot or an inability to reach the detergent concentration set-point in the time available, depending on what conditions have changed. For example, as the detergent container nears depletion it often will feed slower than when full and this will often result in the controller not being able to maintain the detergent concentration in the wash tank at the set-point. As a result, the end users often dispose of detergent containers before the detergent containers are fully depleted.

SENSING A LOW DETERGENT SUPPLY CONDITION

In addition to controlling the detergent concentration about the desired set point, the detergent controller must also alert the operator of the dishwasher when the detergent container is depleted. The alert typically takes the form of a flashing indicator (LED or lamp) and an audible alarm such as a "Smoke Detector type" sonic device. Several approaches to this requirement are covered in the prior art, including the approach taught in U.S. Pat. No. 4,756,321.

All of the prior art approaches have limitations when dealing with dishwashers with short washing cycles or when dealing with detergent formulas that tend to have very slow feed rates during the start-up period after a long dormant period, such as after overnight shut downs of the entire washing operation.

Short washing cycles create a situation where there is not enough time during one cycle to accurately determine that a low detergent conditions exists. Shod cycles tend to produce a condition where the alarm may be very late in issuing its warning, which allows the wash tank detergent concentration to drop well below the required level. However, if the alarm were activated whenever the concentration falls below the set point by a preset amount, then false alarms would be given every time the unit is started with a fresh wash tank, and therefore this type of alarm condition criteria is not in favor. Most low detergent alarms employ some sort of feed time accumulation, and if set point or a preset rise in concentration is not achieved within the allowed time, then the alarm is issued. U.S. Pat. No. 4,756,321 taught an improved approach, but it still has limitations in some conditions.

While short washing cycles create a condition of no alarm when there should be one, the "morning start-up" condition creates a situation where a false alarm may be issued. This is because the detergent may require a few minutes of constant spray before any measurable amount begins to flow. After the hardened powder is dissolved by the spray, the feed rate increases to its normal level and set point is quickly reached. If the alarm timers expire before the hard powder is cleared, then a false alarm occurs. Simply making the alarm condition equal to a longer detergent feed time (without reaching the set point) conflicts with the time limitations placed on the system by the "short cycles" condition.

SUMMARY OF THE INVENTION

In summary, the present invention is a chemical dispenser controller for use with a device, such as the conductivity sensor in a dishwasher's wash tank, that measures the concentration of the dispensed chemical. In a dishwasher a conductivity sensor measures the conductivity of the detergent solution in the wash water tank, which corresponds to the concentration of the dispensed detergent. The controller of the present invention automatically learns the feed rate of the chemical dispenser coupled to the controller regardless of the type of dispenser being used. For each chemical dispensing feed cycle, the controller computes a Feed Factor equal to the amount of "feed on time" required for each unit increase in the dispensed chemical's concentration:

Factor=(Feed On Time)/(Change in Concentration)

This computed feed factor is the inverse of the chemical dispenser's feed rate. The controller stores the computed Feed Factor for the last N feed cycles in a non-volatile memory, and computes a running average of the N feed factors stored in the non-volatile memory. This average feed factor value is used to compute the feed On time for subsequent feed cycles as follows.

Whenever the controller is powered on, or whenever the concentration of the dispensed chemical falls below its set point, the controller determines the difference between the measured chemical concentration and a specified concentration set point value. The computed average feed factor and the difference between the set point and the current concentration are used to compute a feed time:

Feed time=(Average Feed Factor)×(Concentration Differential)

In a preferred embodiment, detergent concentration is measured using logarithmic measurement units, and separate Feed Factors for the detergent dispenser are computed for at least two detergent concentration ranges so as to generate a "piece-wise linear" representation of the detergent dispenser's effective feed rate.

BRIEF DESCRIPTION OF THE DRAWINGS

Additional objects and features of the invention will be more readily apparent from the following detailed description and appended claims when taken in conjunction with the drawings, in which:

FIG. 3 depicts parameters stored in the controller's random access memory.

DESCRIPTION OF THE PREFERRED EMBODIMENTS

Figure 1:
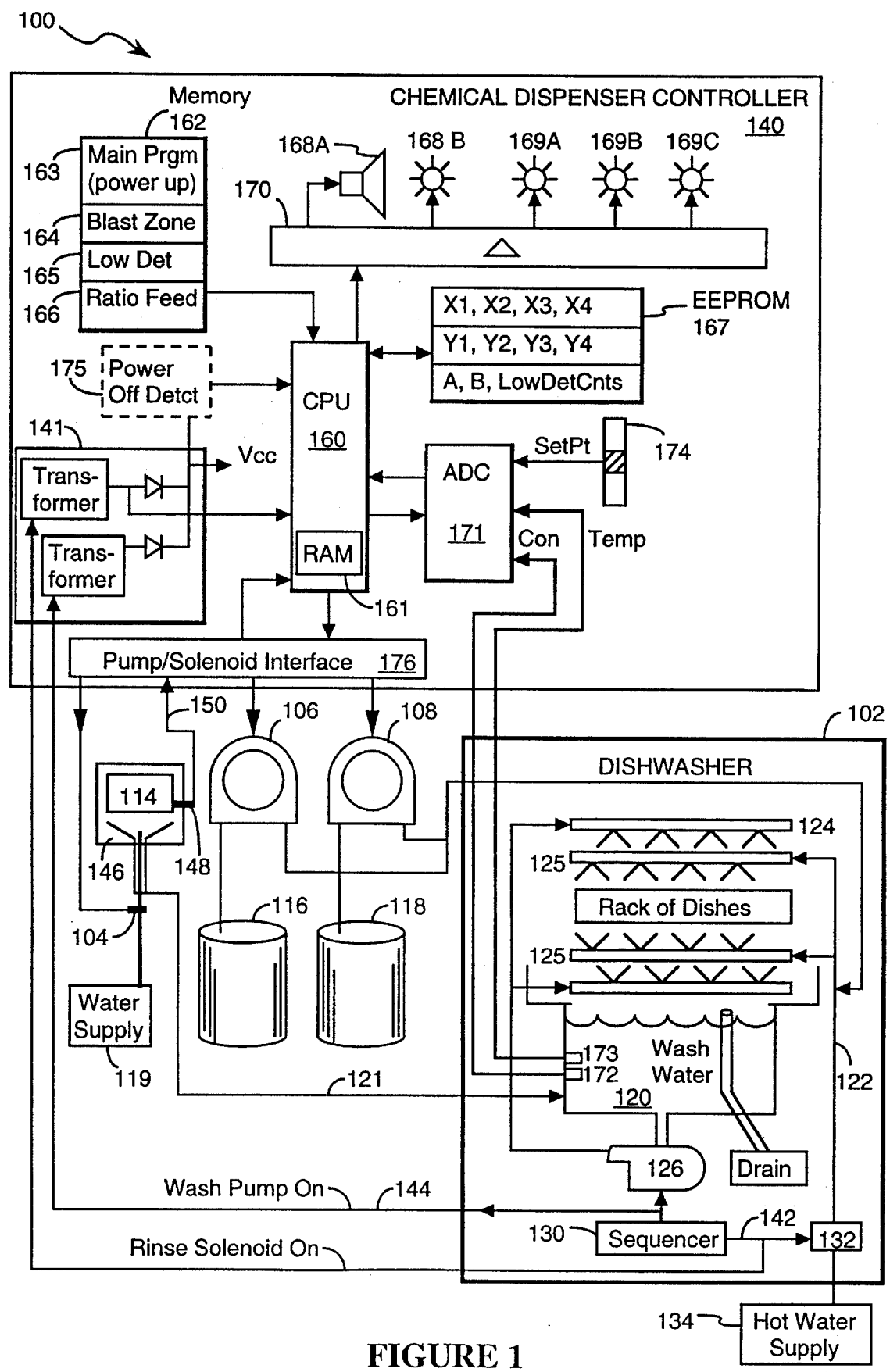
FIG. 1 is a block diagram of a dishwasher system including a detergent chemical dispenser with a controller in accordance with the present invention.

Referring to FIGS. 1, 2 and 3, a dishwasher system 100 in accordance with the present invention includes a dishwasher 102, a water spray solenoid 104 and pumps 106 and 108 for dispensing chemicals from containers 114, 116 and 118 to the dishwasher 102.

In the example shown in FIG. 1, container 114 holds a detergent in powder, tablet or "brick" form, container 116 holds rinse agent and container 118 holds a sanitizer chemical such as bleach or other antibacterial chemical. For convenience, the corresponding solenoid and pumps will be called the detergent solenoid 104, the rinse agent pump 106 and the sanitizer pump 108. In the preferred embodiment the two pumps are peristaltic pumps with pumping capacities matched to the amount of chemical to be dispensed.

The detergent solenoid 104 is an on/off solenoid that allows pressurized water from a water source 119 to spray into the detergent container 114, thereby dissolving and transporting detergent into the dishwasher's wash water tank 120 via a feed tube 121. The rinse agent pump 106 dispenses rinse agent into the clean rinse water in water line 122. Sanitizer is typically used only in "low temperature" dishwashers with rinse water temperature below 180 degrees Fahrenheit. Furthermore, sanitizer may be dispensed either into the rinse water or the wash water tank, although in FIG. 1 it is shown as being dispensed into the rinse water in water line 122. Thus, high temperature dishwasher systems will typically have only two chemical dispensers (for detergent and rinse agent) while low temperature dishwasher systems will typically have three.

The dishwasher 102 can be either a door type dishwasher (sometimes called a batch type dishwasher) or a conveyor type dishwasher. In either type of dishwasher the dishes are first sprayed, via sprayer arms 124, with recycled wash water from tank 120 for a period typically ranging between forty-five seconds and one minute thirty seconds. The wash water in tank 120 contains detergent to assist washing the dishes. A wash water pump 126 is used to draw wash water from tank 120 and pump it into the sprayer arms 124. The action of the wash water pump 126 agitates the water in the tank 120, thereby promoting proper mixing of the detergent added to the tank.

After the initial wash cycle, the dishes are sprayed by with clean, hot rinse water, via sprayer arms 125.

In a door (or batch) type dishwasher, one or more racks of dished are placed in the dishwasher, cleaned, and then removed from the dishwasher before the next racks of dishes are washed. In a conveyor type dishwasher racks of dishes travel on a conveyor through two sections: a wash section and a rinse section.

Door type dishwashers generally include a sequencer 130 that turns on the wash water pump 126 during the machine's wash cycle and opens the rinse water control solenoid 132 during the rinse cycle to allow water from a hot water supply 134 to flow into the machine's rinse water line 136. Therefore these basic timing functions are provided by the dishwasher's built in sequencer 130 rather than the controller 140 for the chemical dispensers, described below. In conveyor type dishwashers the wash water pump is always on when the dishwasher is active, but the rinse water solenoid 132 is activated only when a sensor arm in the rinse section detects the presence of a rack of dishes. In both door type and conveyor type dishwashers, the signal on line 142 used to open the rinse water solenoid valve 132 is typically a 115 or 208 volt a.c. signal.

As shown in FIGS. 1 and 2, in the preferred embodiment the only signal lines connecting the dishwasher 102 to the controller 140 are (1) the wash pump power line 144 on which the sequencer 130 asserts power so as to turn on the wash water pump 126, and (2) either the rinse solenoid power line 142 or a pressure signal from the rinse water line 122 that closes a pressure switch when water is flowing through the rinse line 122. The power lines 144 and 142 are coupled to a power conditioning circuit 141 in the pump controller 140 for the purpose of providing power to the controller 140, the solenoid 104 and the pumps 106 and 108.

The power conditioning circuit includes two transformers 141 and two full wave bridge rectifiers and outputs a 24 volt a.c. signal for use by the solenoid and pumps. A five-volt regulator is used to provide a 5 volt d.c. signal for powering the control circuitry.

Figure 2A:
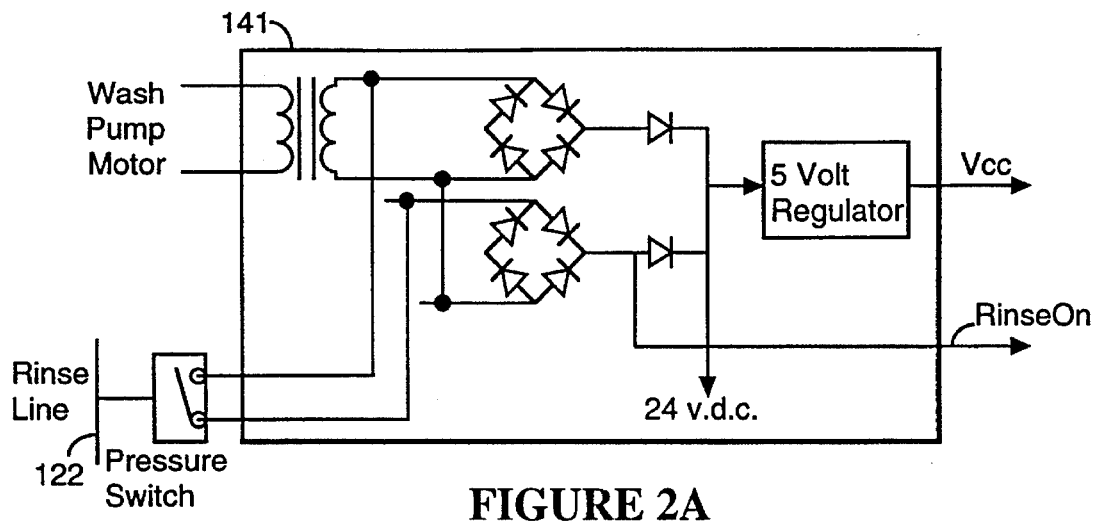
FIGS. 2A and 2B show, in more detail than in FIG. 1, how the controller of FIG. 1 derives power from the dishwasher.
Figure 2B:
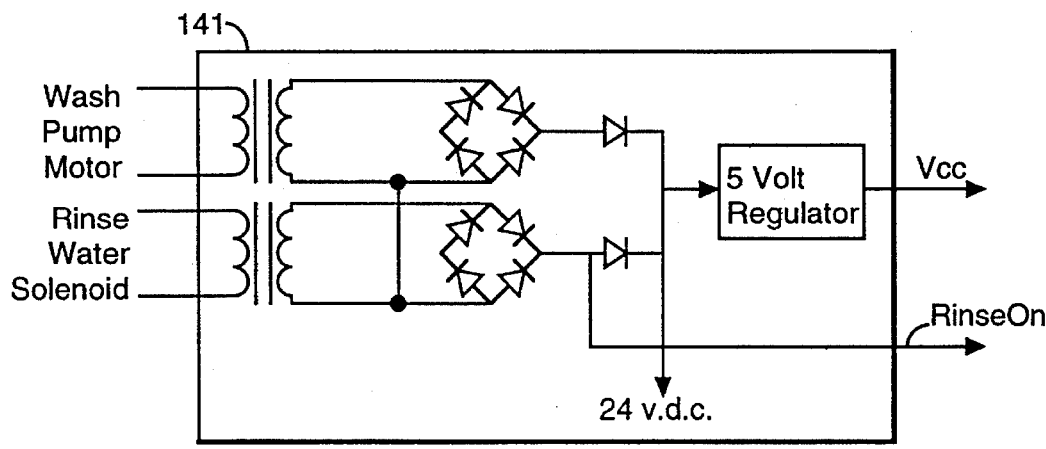

In conveyor type dishwashers, a pressure switch coupled to the rinse water line 122 is typically used, connected as shown in FIG. 2A, to provide a RinseOn signal. The RinseOn signal is used by the CPU to determine when to turn on the rinse agent pump 106. Alternately, as shown in FIG. 2B, a second transformer coupled to the rinse water solenoid in the dishwasher can be used to generate the RinseOn signal. In door type dishwashers, the second transformer shown in FIG. 2B must be used to provide power to the controller during the rinse portion of the dishwashing cycle, because the wash water pump is off during the rinse cycle. Therefore in door type dishwashers the rinse water pressure switch of FIG. 2A is not used.

Some, but not all, detergent dispensers 146 include a safety switch 148. The safety switch 148 is opened whenever the detergent container 114 is removed from the detergent dispenser 146, and the switch 148 is closed when a detergent container is inserted into the dispenser 146. A second signal line 150 connects the remotely located Dispenser Safety Switch 148 to the controller 140. The controller 140 detects the safety switch status signal on line 150 and breaks the electrical connection to the solenoid valve whenever the detergent container is removed from the dispenser. The controller 140 also uses the safety switch status to reset the Low Detergent Alarm function (as will be described below) so that removing the detergent container after an alarm automatically results in the cancellation of the Low Detergent alarm.

CHEMICAL DISPENSER CONTROLLER

The controller 140 of the preferred embodiment includes a microcontroller (CPU) 160, random access memory (RAM) 161 (typically incorporated in the same integrated circuit as the microcontroller) for storing parameters and control parameters, read only memory 162 (also typically incorporated in the same integrated circuit as the microcontroller) for storing the control software 163, 164, 165, 166 executed by the microcontroller 160, and non-volatile memory 167 for storing parameters that control the dispenser's operation. In the preferred embodiment the microprocessor 160 is a Microchip PIC16C57, which is an 8-bit microprocessor made by MicroChip Technology Inc, and the non-volatile memory 167 is an X24C45 EEPROM made by Xicor. This 256 bit (16 bits×16 bits) device uses a serial microcomputer interface and features an "Auto Store" capability which automatically stores data upon power loss. In particular, the EEPROM 167 includes a "shadow RAM", the contents of which are copied into corresponding nonvolatile EEPROM cells upon power loss. Thus, whatever data the CPU 160 stores in the EEPROM's shadow RAM is automatically saved in the EEPROM upon power loss.

A user interface 170 includes buttons (not shown) for priming the pumps and for other user functions, a sonic alarm device 168A and a Low Detergent LED 168B for warning the user that the detergent supply has been exhausted, and three LEDs 169A–169C that are turned on when corresponding ones of the solenoid and pumps are on. The controller 140 in the preferred embodiment includes a housing (not shown) that encloses both the printed circuit board on which the controller's circuit 140 is mounted and the motors for the pumps, with the user interface 170 positioned on a front panel of the housing for easy user access. The controller's housing preferably includes a hinged door or panel to provide access to a set of mode control switches (not shown) and a set of motor speed control dials (not shown).

The controller 140 includes an analog to digital converter (ADC) 171, which in the preferred embodiment is a TLC 541IN made by Texas Instruments, which is an 8 bit converter with 11 analog inputs and a serial interface to the microcomputer 160. Only four of the analog inputs to the ADC 171 are used in the preferred embodiment. Those four inputs are: two inputs are used for conductivity measurement and are coupled to a conductivity sensor 172, one input is coupled to a thermistor 173, and a fourth ADC input is used to "read" the position of the dial on a small potentiometer 174. The potentiometer 178 is used to specify the detergent Set Point, and thus allows the Set Point to be easily adjusted in the field. The potentiometer's dial is calibrated in Beta Units (see U.S. Pat. No. 4,756,321) and ranges from 10 to 70 Beta Units. As explained in U.S. Pat. No. 4,756,321, Beta Units are a logarithmically scaled concentration measurement scale. A "1 Beta Unit" increase of the detergent solution conductivity level corresponds to approximately a 5 percent increase in the detergent concentration level (e.g., as measured in units of detergent per gallon of wash water). A change in detergent concentration of twenty Beta Units represents a change in detergent concentration of approximately 165%. In the Figures, the term "Beta Unit" is abbreviated as "BU".

In embodiments of the controller 140 that use a standard EEPROM memory without an autostore capability, the controller also includes a power down detection circuit 175 that generates a power fail interrupt signal whenever the power supply to the board is turned off. The power fail interrupt signal is generated at least 10 milliseconds before the power supply voltage declines to the point that continued operation of the CPU 160 and EEPROM 167 can no longer be guaranteed. The power fail interrupt signal is used by the controller 140 to start execution of a short routine that stores eleven parameters (identified in FIG. 3) in the EEPROM 167. The power fail detection circuit 175 may be implemented with any number of well known circuits, one example of which is the Max690 made by Maxim Integrated Products Inc.

NONVOLATILE MEMORY AND RAM USAGE

Referring to FIG. 1, the EEPROM 167 is used to store eight parameters X0–X3 and Y0–Y3 that are used to determine the detergent feed ratios when dispensing detergent into the dishwasher's wash tank, as well as two parameters A and B for detecting a low detergent condition, and a timer setting, LowDetergentCounts, that determines how long the controller will attempt to feed detergent to a dishwasher when the measured detergent concentration is very low.

Referring to FIGS. 1 and 3, the CPU 160's RAM 161 is used to store various parameters (shown in FIG. 3) that will be referred to below, including a copy of the contents of the EEPROM 167 which is loaded into the CPU's RAM upon power up.

A Store Flag is used by the CPU 160 to indicate when the value of the RAM copy of any of the eleven parameters stored in the EEPROM 167 has been changed. Whenever the Store Flag is set, these parameters are copied into the shadow RAM of the EEPROM 167, which ensures that these parameters will be saved upon a power failure.

THREE MODES OF OPERATION

Figure 4:
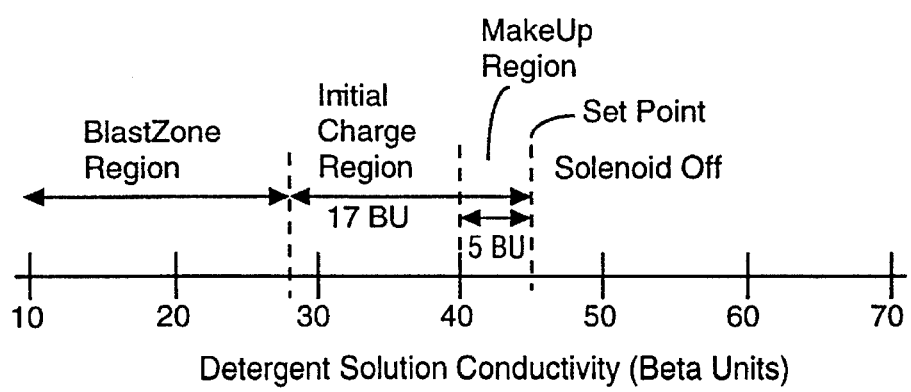
FIG. 4 depicts a graph of detergent solution conductivity, showing the preferred detergent dispenser controller's mode of operation for different ranges of detergent solution conductivity.

Referring to FIG. 4, in the preferred embodiment the Controller 140 uses different detergent feeding control strategies in three distinct detergent concentration ranges: the Blast Zone region, the Initial Charge region and the Make Up region.

The use of different detergent feeding control strategies for different conductivity ranges is important since there are inertial differences between the very short feed ON times required to maintain Set Point while in the Make-Up region (often less than ½ second) and the much longer feed ON times required to reach Set Point from a fresh wash tank. Other differences also come into play when the possibility of very slow feed rates first thing in the morning is considered.

When the detergent solution conductivity is 17 or more Beta Units below the detergent Set Point (i.e., when the conductivity of the detergent/water solution is less than about 42.7% of the target conductivity level), the controller uses a "Blast Zone" mode of operation in which it turns on the detergent solenoid for as long as 120 seconds until the detergent solution conductivity is within 17 Beta Units of the Set Point.

When the detergent solution conductivity is between 17 Beta Units and 5 Beta Units of the Set Point (i.e., between approximately 42.7% and 77.9% of the target conductivity level), the Controller 140 uses an "Initial Charge" mode of operation, in which the detergent solenoid is turned on for a computed length of time based on the historical average feed rate of detergent of the system when the detergent solution conductivity is between 17 Beta Units and 5 Beta Units of the Set Point. In particular, the detergent solenoid is turned on for a time period equal to $$\text{SolenoidFeedTime} = Y\_\text{Ave} \times (\text{Set Point} - \text{Concentration})$$

where Y_Ave is the historical "seconds per Beta Unit" Feed Factor for the Initial Charge conductivity region. That is, Y_Ave is equal to the average detergent feed time, measured in eighths of a second, required to raise the detergent concentration by one Beta Unit while the detergent concentration is in the Initial Charge region. The maximum allowed SolenoidFeedTime in the Initial Charge region is 26 seconds (corresponding to a SolenoidFeedTime value of 26×8=208).

When the detergent solution conductivity is within 5 Beta Units of the Set Point (i.e., within about 22% of the target concentration), the Controller 140 uses a "Make Up" mode of operation, in which the detergent solenoid is turned on for a computed length of time based on the historical average feed rate of detergent of the system when the detergent solution conductivity is within 5 Beta Units of the Set Point. In particular, the detergent solenoid is turned on for a time period equal to $$\text{SolenoidFeedTime} = X\_\text{Ave} \times (\text{Set Point} - \text{Concentration})$$

where X_Ave is the historical "seconds per Beta Unit" Feed Factor for the Make Up conductivity region. That is, X_Ave is equal to the average detergent feed time, measured in eighths of a second, required to raise the detergent concentration by one Beta Unit while the detergent concentration is in the Make Up region. The maximum allowed SolenoidFeedTime in the Make Up region is 26 seconds (corresponding to a SolenoidFeedTime value of 26×8=208).

LOW DETERGENT CONDITION

As an initial matter, it should be understood that the term "Low Detergent condition" is an industry standard term that actually means that the detergent supply has been completely exhausted (i.e., that the detergent container is empty). There are no sensors used in the detergent containers to directly determine when they are empty. The controller must determine that the detergent container is probably empty by detecting that the conductivity of the detergent solution in the wash tank no longer rises when the detergent dispenser is on.

A "Feed Cycle" is herein defined to mean a continuous period of time in which the detergent dispenser is On, and is bounded by time periods in which the detergent dispenser is Off.

There are three conditions that can occur that will cause the controller to activate the Low Detergent alarm. First if the controller executes five or more Feed Cycles within the Initial Charge Region without reaching the Make Up Region (5 Beta Units below Set Point), then the Low Detergent flag will be set and the Low Detergent alarm will be activated. Second, if the controller executes five or mare Feed Cycles, with the first one starting within the Make Up region without reaching Set Point, then the Low Detergent flag will be set and the Low Detergent alarm will be activated. Third, if the controller continuously turns the detergent dispenser On while in the Blast Zone for 120 seconds, or 20 seconds if a low detergent condition was previously detected since the last time the wash water solution reached Set Point, without reaching the wash water solution reaching the Initial Charge region, then the Low Detergent flag will be set and the Low Detergent alarm will be activated.

The Low Detergent condition is resolved only when the detergent supply is replaced and the controller detects that this has happened. As discussed earlier, in some chemical dispenser systems (see FIG. 1) the detergent dispenser 146 includes a safety switch 148. In these systems the controller will clear the LowDetergent flag whenever it detects that the safety switch 148 has been "cycled" (i.e., opened and closed), indicating that a new detergent container has been inserted into the dispenser 146.

In dishwasher systems that do not have a detergent removal safety switch, the dishwasher must be turned off in order to replace the detergent container because in systems lacking a safety switch it is only when the dishwasher is off that the user can be sure that the detergent solenoid will not turn on. Turning the dishwasher off cuts power to the controller 140, and that in turn clears the LowDetergent flag.

The preferred embodiment of the controller can handle low detergent conditions in two different ways, depending on which of two modes is selected at the time the controller is installed.

The first method of handling low detergent conditions is to activate the Sonic alert in a "beeping" mode along with a flashing of the an Alarm lamp, while continuing to try to feed detergent to the Set Point. This controller state is called the Alarm state. The LowDetergent Flag is reset and the alarms turned off when the detergent concentration reaches Set Point.

If after a preset time period (typically 3 to 5 minutes) the Alarm has not been reset by rising concentration, the next step is to stop all Feed Cycles and set the Sonic alert to a constant sound and the Alarm lamp to a constant On condition. This controller state is called Over Feed Stop. The Over Feed Stop state is reset when the power to the controller is cycled Off and then back On. Both the Alarm state and the Over Feed Stop state are reset if the dispenser's safety switch is cycled (i.e. the detergent container is removed and replaced). However, many dispensers do not have such a safety switch. This first method of handling low detergent conditions is used when there is no safety problem involved if the dishwasher operator services the dispenser (changes the detergent container) while the controller is still trying to feed to Set Point.

The second method of handling low detergent conditions is to stop all detergent feed cycles, wait five seconds for any detergent to drain from the dispenser, set the controller state to Over Feed Stop, and then turn on the sonic alert and Alarm lamp. The LowDetergent flag and Over Feed Stop state are cleared when the safety switch 148 is cycled or when the power to the controller is cycled through OFF and back to ON. This second method of handling low detergent conditions is used when the detergent dispenser must be placed in a non-feed mode prior to alerting the operator that service is required. The preferred embodiment of the present invention represented by the Figures and shown below uses only the second method of handling low detergent conditions because it is safer. However, the present invention can be used equally well with the first method of handling low detergent conditions.

DETERGENT FEED CONTROL PROGRAMS

Figure 5:
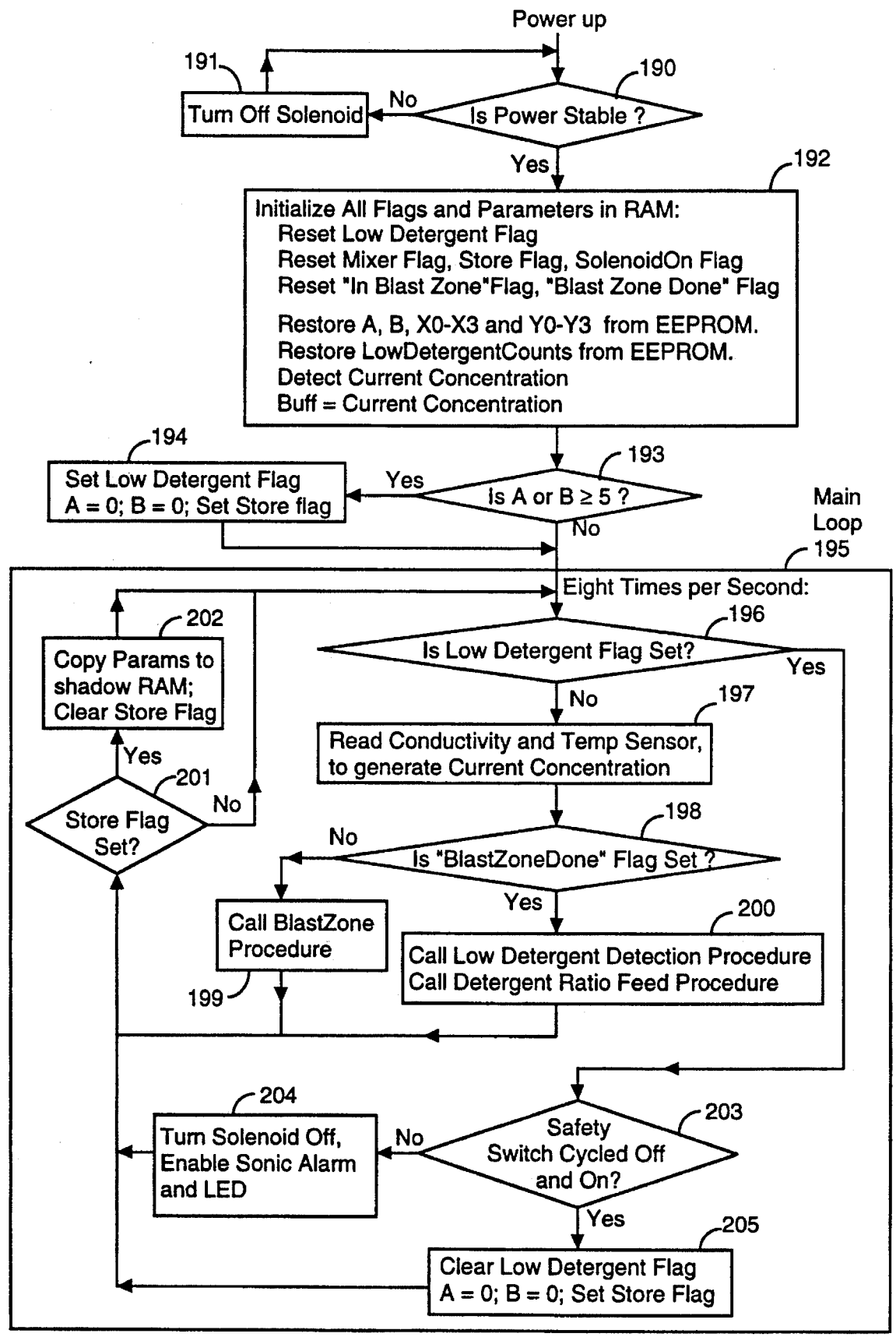
FIG. 5 depicts a flow chart of the main detergent dispenser control program in a preferred embodiment of the present invention.

The Main Control program 163, whose flowchart is shown in FIG. 5, is invoked whenever the controller is powered on. The Main Control program 163 first waits until the power supply to the controller is stable (steps 190, 191) and keeps the detergent solenoid turned off. The stabilization wait time is about seven seconds in the preferred embodiment.

Once power is stabilized, the main control program initializes the parameters array (step 192) in RAM 161 by resetting all status flags (including the LowDetergent Flag, Mixer Flag, Store Flag, "In Blast Zone" flag, "Blast Zone Done" Flag, as well as the 1stFeedDone Flag, SolenoidOn Flag, etc.), and copying the contents of the nonvolatile memory 167 into the appropriate RAM registers. The main control program also reads the conductivity and temperatures sensors, generates a Current Concentration value from the sensed conductivity and temperature values, and stores the Current Concentration in the Old Concentration Buffer, thereby initializing the Old Concentration value.

Then, for reasons associated with the short run cycle of door type dishwashers that will be explained below, at step 193 the Main Control program 163 tests the A and B cycle count parameters that were just recovered from the nonvolatile memory. If either A or B is greater than or equal to 5, the LowDetergent Flag is set, A and B are reset to zero, and the Store Flag is set (step 194).

Then the Main Control program starts execution of the main control loop 195, which is repeatedly executed at a rate of eight times per second in the preferred embodiment. The steps of the main control loop are, in sequence, (1) testing the LowDetergent Flag (step 196), (2) reading the conductivity and temperature sensors and generating a Current Concentration value from the sensed conductivity and temperature values (with the result being stored as the Current Concentration value) (step 197), (3) testing the "BlastZoneDone" flag (step 198), (4) if the "BlastZoneDone" flag is not set, calling the Blast Zone procedure 165 (step 199) and otherwise (5) if the "BlastZoneDone" flag is set, calling the Low Detergent Detection procedure and then the Ratio Feed procedure 166 (step 200), (6) testing the Store Flag (step 201), (7) if the Store Flag is set, copying the A, B, X1 to X4, Y1 to Y4 and LowDetergentCounts parameters to the shadow RAM of the EEPROM, and clearing the Store Flag (step 202).

Whenever the LowDetergent Flag is found in step 196 to be set, the Main Control Program 163 checks whether the detergent safety switch has been cycled off and on (step 203). If the safety switch has not been cycled off and on, the detergent solenoid is turned off and the sonic alarm 168A and Low Detergent LED 168B are enabled (step 204). If the safety switch has been cycled off and on, the LowDetergent Flag is cleared, the A and B cycle counters are reset to zero, and the Store Flag is set (step 205). The Main Control Program 163 then resumes at step 201, as described above.

BLAST ZONE PROCEDURE

Figure 6:
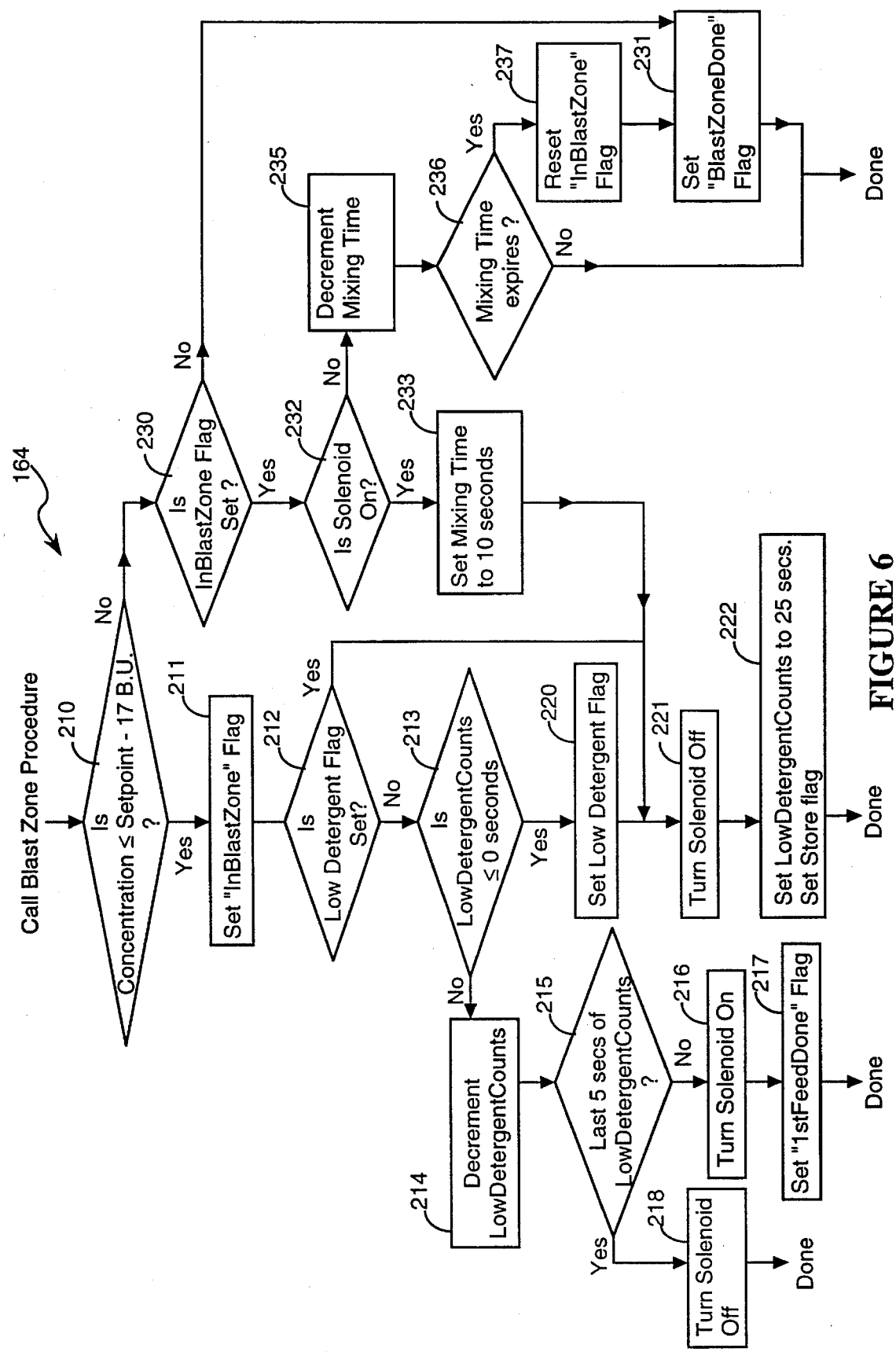
FIG. 6 depicts a flow chart of the "Blast Zone" detergent dispenser control procedure in a preferred embodiment of the present invention.

Referring to FIG. 6, the Blast Zone procedure 164 works as follows. The first step of the procedure is to determine whether or not the Current Concentration (i.e., conductivity value) is 17 or more Beta Units below the set point (step 210), which is herein called the Blast Zone of operation (see FIG. 4). The Current Concentration (called the "Concentration" in the flowcharts) will normally be in the Blast Zone only after the wash tank has been drained and replaced with clean water, but extended operation of the dishwasher with an exhausted detergent supply will also cause the Current Concentration to fall into this range.

If the Current Concentration is in the Blast Zone, the next step is to set the "InBlastZone" flag (step 211), and then to check the LowDetergent flag (step 212) which is set if the detergent container was previously determined to be empty. Assuming that the LowDetergent flag is not set, the next step is to compare the LowDetergentCounts value with zero (indicating expiration of the LowDetergentCounts timer) (step 213).

Note that the LowDetergentCounts value is initialized to either 200 (for a time duration of 25 seconds) or 1000 (for a time duration of 125 seconds) by the main procedure at power up, by copying the LowDetergentCounts parameter from the EEPROM 167 into the LowDetergentCounts parameter in RAM (see FIGS. 1, 3 and 5).

If the LowDetergentCounts value is greater than zero, the LowDetergentCounts value is decremented by 1 (step 214). Then in step 215 the LowDetergentCounts value is compared with a value corresponding to five seconds (i.e., compared with 40). If LowDetergentCounts corresponds to more than five seconds, the detergent solenoid is turned on (or kept on if it is already on) at step 216, the "1stFeedDone" flag is set (to indicate that a the dispenser has had a first detergent feed cycle) at step 217, and then the Blast Zone procedure exits.

If LowDetergentCounts corresponds to five seconds or less, the detergent solenoid is turned off (or kept off if it is already off) at step 218 and then the procedure exits. Thus, the Blast Zone procedure 164 provides a five second detergent mixing time before expiration of the time allotted for the detergent concentration to rise above the Blast Zone.

If, at step 213, the LowDetergentCounts value is zero or less (which will generally happen only if the detergent supply has been exhausted) the LowDetergent flag is set (which enables the sonic alarm and alarm light) at step 220. Furthermore, detergent solenoid is turned off (or kept off if it is already off) at step 221 and the LowDetergentCounts parameter is set to 25 seconds and the EEPROM store flag is also set (step 222).

The LowDetergentCounts parameter is set to 25 seconds at step 222 so that the period of time for detecting a Low Detergent condition (e.g., after power to the Controller 140 is cycled Off and back On) will be relatively short once a Low Detergent condition has been detected. As will be seen later, whenever the detergent concentration reaches the Set Point, the LowDetergentCounts parameter is increased to 125 seconds so that the period of time for detecting a Low Detergent condition is returned to its normal value once the detergent supply has been replaced. Since the LowDetergentCounts value is stored in the EEPROM 167, its value is maintained even when the Controller 140 losses power.

Referring back to step 210, if the Current Concentration is not in the Blast Zone, the next step (230) is to check the "InBlastZone" flag. If the InBlastZone flag is not set, the BlastZoneDone flag is set at step 231 and then the procedure exits. If the InBlastZone flag is determined to be set at step 230, the detergent solenoid's status (i.e., the SolenoidOn flag) is checked at step 232. The first time step 232 is performed the solenoid will normally be on, in which case the Mixing Time parameter is set to 10 seconds at step 233, the solenoid is turned off at step 221 and the LowDetergentCounts parameter is set to 25 seconds at step 222.

The LowDetergentCounts is reduced to 25 seconds when the wash water solution's concentration starts in the Blast Zone and rises into the Initial Charge region, because one long (120 second) Blast Zone feed cycle should be more than sufficient to recharge a wash tank with fresh water. After that one long feed cycle, failure to raise the detergent concentration from the Blast Zone to the Initial Charge region in 20 seconds (plus a five second mixing time) is indicative of the detergent supply being exhausted.

The second and subsequent times step 232 is performed, the solenoid will normally be Off, in which case the Mixing Time parameter is decreased by 1 at step 235 and then the Mixing Time parameter is compared with zero at step 236. If the Mixing Time has expired (i.e., is less than or equal to zero), the InBlastZone flag is reset to "0" at step 237, the BlastZoneDone flag is set to "1" at step 231, and then the Blast Zone procedure 164 is exited. If the Mixing Time has not expired (i.e., is greater than zero), the Blast Zone procedure is exited.

As indicated above, if the detergent concentration at the time the controller is powered on is in the Blast Zone, the Blast Zone procedure 164 will be executed eight times per second until (A) the LowDetergentCounts time expires without bringing the Current Concentration above the Blast Zone, causing the LowDetergent flag to be set and the corresponding alarms to be activated, or (B) enough detergent is dispensed to raise the Current Concentration above the Blast Zone and a ten second Mixing Time expires.

LOW DETERGENT DETECTION PROCEDURE

Figure 7:
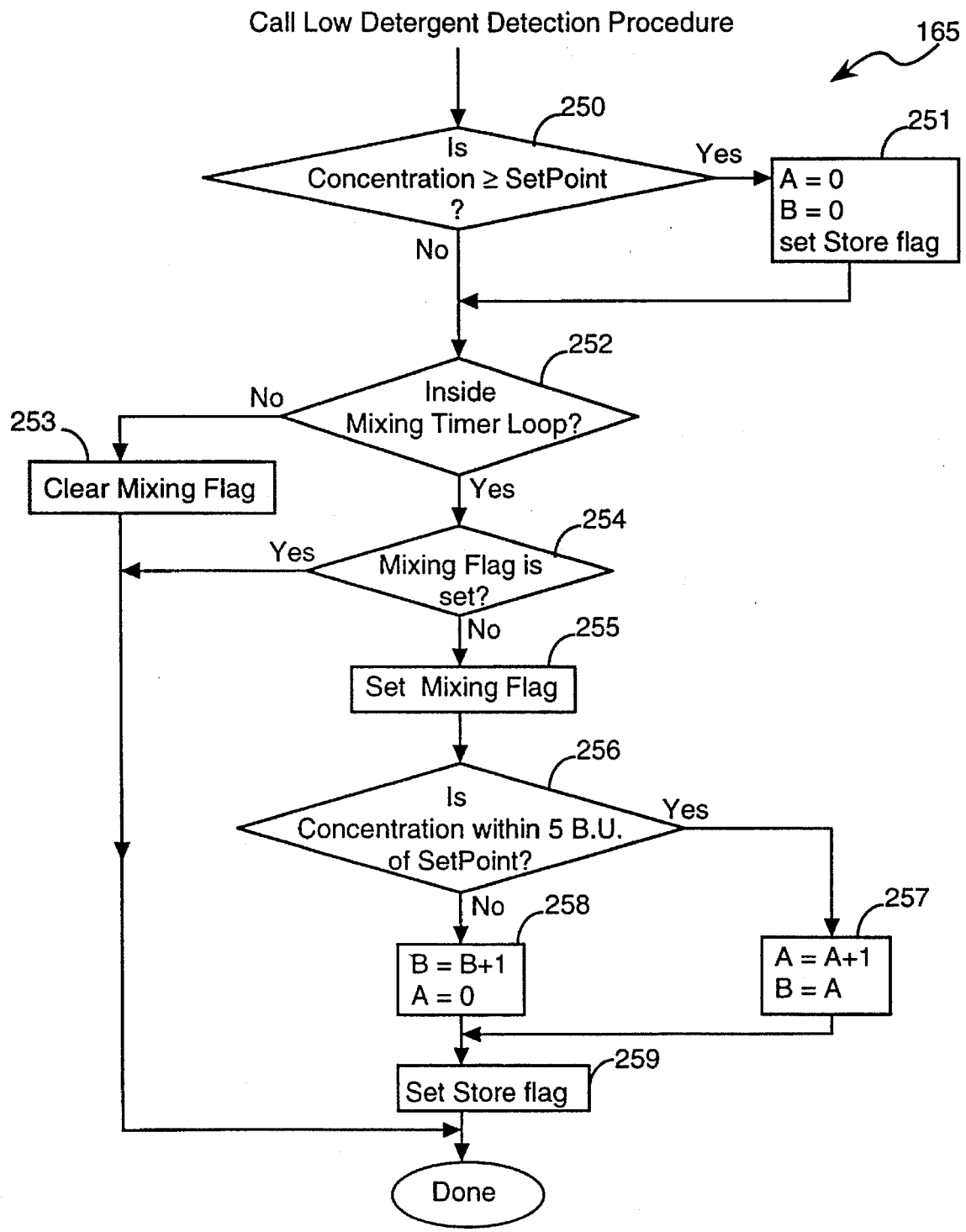
FIG. 7 depicts a flow chart of the "Low Detergent" procedure in a preferred embodiment of the present invention.

Referring to FIG. 7, the Low Detergent Detection procedure 165 is executed eight times per second run, except when the Blast Zone procedure 164 is being executed (e.g., after a the dishwasher's wash water has been drained and replaced with clean water). The first step 250 of the Low Detergent Detection procedure 165 is to compare the Current Concentration (called the "Concentration" in the flowcharts) with the Set Point. If the Current Concentration is at or above the Set Point, the A and B Feed Count parameters are set to zero (step 251). Otherwise, A and B are left unchanged.

Next, at step 252 the Mixer Time value is compared with zero. If the Mixer Time is equal or less than zero, the Mixing Flag is cleared at step 253 and the procedure exits. If the Mixing Time is greater than zero, which means that a Feed Cycle has been completed (except for the mixing time portion of the Feed Cycle), the Mixing Flag is checked at step 254.

If the Mixing Flag is Set, the procedure exits. Otherwise, the Mixing Flag is set at step 255 and the Current Concentration is compared at step 256 with a value five Beta Units below the Set Point 256 to determine whether the Current Concentration is in the Make Up region or the Initial Feed region (see FIG. 4). If the Current Concentration is in the Make Up region, the A Feed Count parameter is increased by one and its value is copied into the B Feed Count parameter. If the Current Concentration is not in the Make Up region, the B Feed Count parameter is increased by one and the A Feed Count parameter is set to zero. The Store Flag is set (to ensure that A and B are stored in the nonvolatile memory if the controller is powered down) at step 259 and then the procedure exits.

The purpose of steps 252 through 259 is to increase A by one for each detergent Feed Cycle while the Current Concentration remains in the Make Up region, and to increase B by one for each detergent Feed Cycle while the Current Concentration is below the Make Up region. When the Current Concentration is in the Make Up region, the A Feed Count value is copied into the B Feed Count to enable the controller to detect when the detergent concentration is decreases from the Make Up region to the Initial Charge region. The A and B Feed Counts are used by the Ratio Feed procedure to detect exhaustion of the detergent supply.

RATIO FEED CONTROL

Figures 8, 8A, 8B:
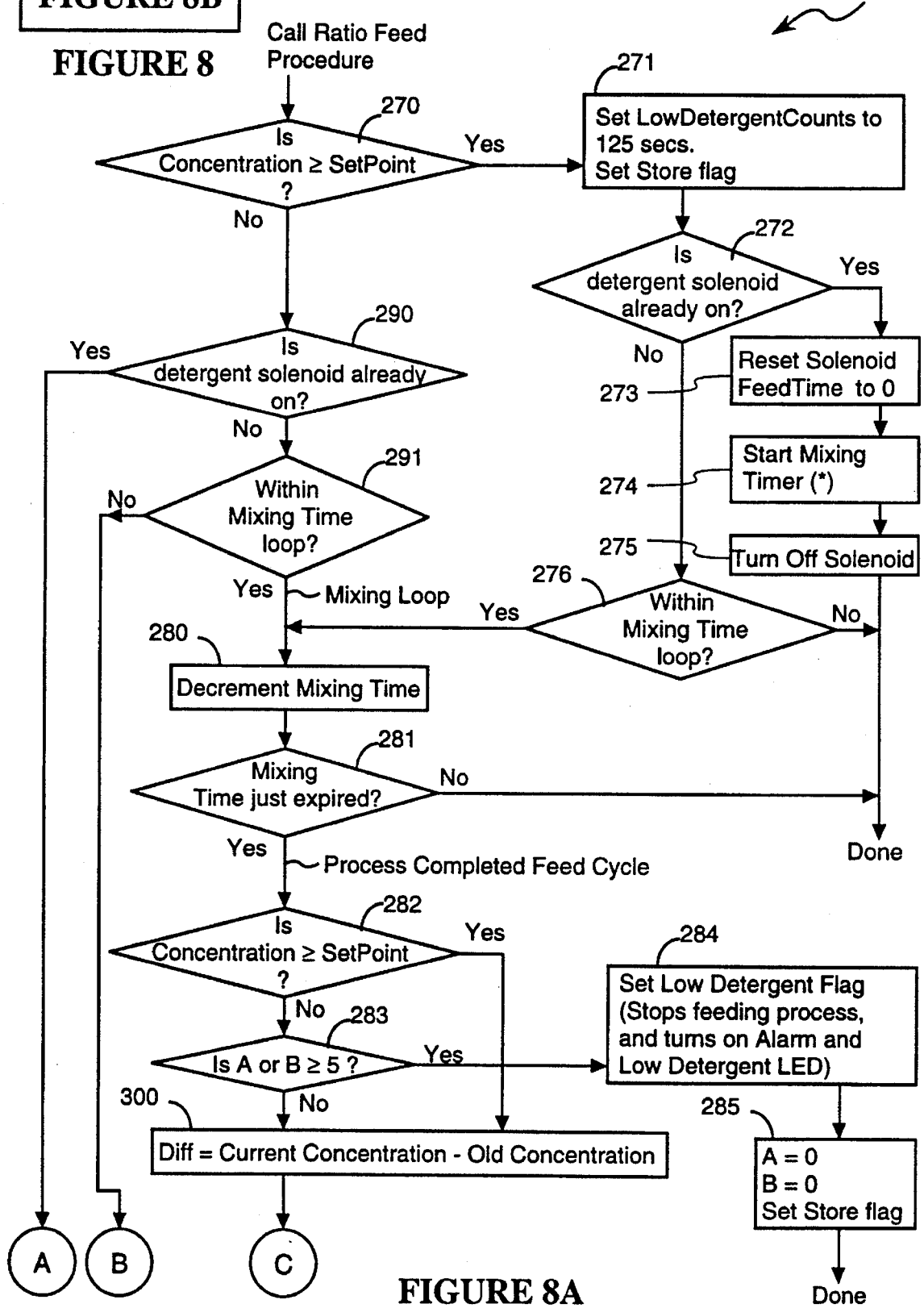
FIG. 8 depicts a flow chart of the "Ratio Feed" dispenser control procedure in a preferred embodiment of the present invention.
Figure 8B:
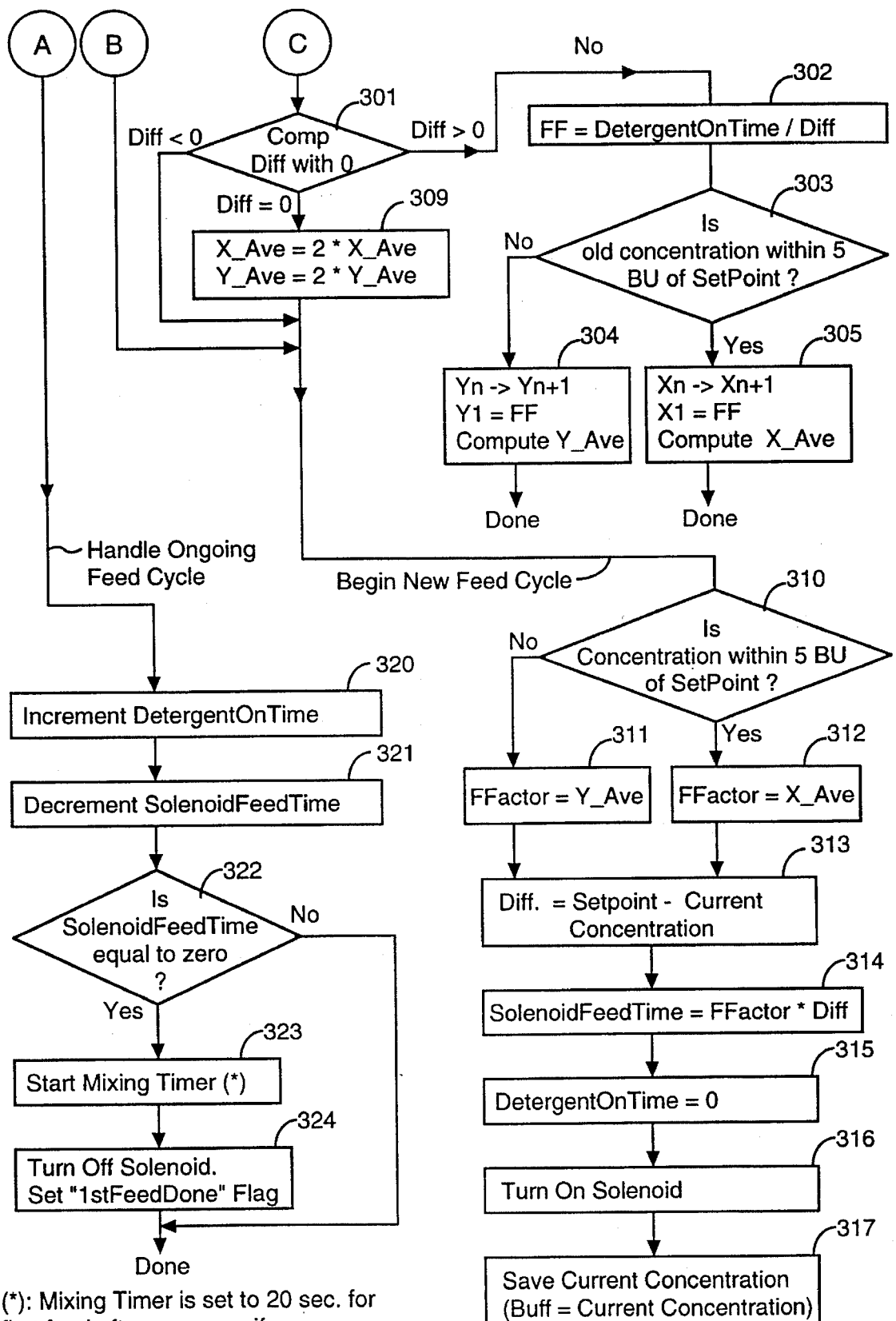

Referring to FIG. 8, the Ratio Feed Procedure 166 begins with step 270 comparing the Current Concentration to the Set Point concentration. If the Current Concentration is at or above the Set Point, the LowDetergentCounts parameter is set to 125 seconds (i.e., a value of 1000) at step 271. Next, the procedure checks at step 272 if the Detergent Solenoid is already On. If so, the SolenoidFeedTime is reset to zero (step 273), and a "Mixing Timer" is started at Step 274, turning off the detergent solenoid at step 275, and then exiting. The Mixing Time parameter is set to 20 seconds if this is the first detergent feed since the Controller was powered on and the detergent concentration at the beginning of the wash cycle was in the Initial Charge region, otherwise it is set to 10 seconds.

The Mixing Time is set to 20 seconds after the first feed cycle if the concentration is in the Initial Charge region to ensure that the Low Detergent Alarm is activated for a suitably long period of time in door type dishwashers. In particular, if the mixing time were 10 seconds, the LowDetergent flag would often be set 43 seconds after the dishwasher is power on (7 seconds of power stabilization, 26 seconds feed time and 10 seconds mixing time), which is just two seconds before power is turned off in many door type dishwashers. By making the first mixing time after power on 20 seconds, the LowDetergent flag will not be set during the last few seconds of a door type machine's wash cycle. Rather, the LowDetergent flag is set at the beginning of the next wash cycle, allowing the Low Detergent Alarm to be sounded for an entire wash cycle after the 7 second power stabilization period.

If the detergent solenoid was not already on (step 272), the procedure next checks at step 276 to see if the system is currently in a "Mixing Time loop", meaning that the system is waiting for a 10 or 20 second mixing time to expire. If not, the wash water is at or above Set Point and no detergent Feed Cycle or Mixing Time is being monitored by the controller, and thus the procedure simply exits.

If the controller is currently in a Mixing Time loop (step 276), the next step is to decrement the Mixing Time parameter at step 280 and then to check if the Mixing Time has just expired at step 281. If the Mixing Time as not just expired, the Ratio Feed procedure exits. This sequence of steps will repeat eight times per second until the Mixing Time expires (step 281).

When the Mixing Time expires (step 281), the Ratio Feed Procedure determines the results of the last Feed Cycle and stores corresponding information. This process beings at step 282, at which point the Ratio Feed procedure compares the Current Concentration to the Set Point Concentration. If the Current Concentration is below the Set Point, the procedure checks at step 283 to see if either of the Feed Cycle counters A or B is greater than equal to five. If so, this means that the detergent supply 114 is most likely exhausted, because Set Point has not been achieved in a reasonable number of feed cycles. As a result, the LowDetergent flag is set at step 284, which causes all detergent feed processes to be disabled and for the sonic alarm 168A and the Low Detergent LED 168B (see FIG. 1) to be turned on. Finally, the A and B Feed Cycle counters are reset to zero at step 285, and then the procedure exits.

Returning to the beginning of the Ratio Feed procedure, if the Current Concentration is less than the Set Point (step 270) and the Solenoid is already on (step 290), this means that the controller is in the midst of a Feed Cycle. The Feed Cycle portion of the Ratio Feed procedure will be explained after we have explained the procedure for determining the length of each Feed Cycle.

It is also possible for the controller to call the Ratio Feed procedure when the Current Concentration is less than the Set Point (step 270), with the detergent solenoid off (step 290), and not be in the middle of a mixing time loop (step 291 ). This will happen (A) when the controller is first powered on and the Current Concentration is above the Blast Zone, but below the Set Point, (B) after a successful Blast Zone feed cycle is completed, and (C) when the detergent concentration was previously at or above the Set Point, but continued operation of the dishwasher dilutes the wash water with rinse water, thereby causing the detergent concentration to fall below the Set Point.

UPDATING THE RATIO FEED COEFFICIENTS

When the Mixing Timer expires, if the Current Concentration is at or above the Set Point (step 282), or if both the Feed Cycle counters A or B are less than five, the Ratio Feed procedure begins the process of updating its feed rate coefficients by computing, at step 300, the change in concentration, Diff, caused by the last Feed Cycle:

Diff=Current Concentration–Old Concentration.

The change in concentration, Diff, is compared with zero at step 301. If the change in concentration is positive, meaning that the last detergent Feed Cycle caused an increase in detergent concentration, the next step 302 is to compute a Feed Factor FF for the last feed cycle:

FF=DetergentOnTime/Diff, where "DetergentOnTime" is equal to the length of the last Feed Cycle, measured in eighths of a second.

At step 303, it is determined whether the Old Concentration (i.e., the concentration at the beginning of the last Feed Cycle), was in the Initial Charge or Make Up regions. If the Old Concentration was in the Initial Charge region, at step 304 the Y Feed Factor values are shifted:

$$Y4=Y3$$

$$Y3=Y2$$

$$Y2=Y1,$$

the Y1 Feed Factor is set equal to the previously computed Feed Factor:

$$Y1=FF,$$

and the average feed factor Y_Ave for the Initial Charge region is computed:

$$Y\_Ave=(Y1+Y2+Y3+Y4)/4.$$

Alternately, if the Old Concentration was in the Make Up region, at step 305 the X Feed Factor values are shifted:

$$X4=X3$$

$$X3=X2$$

$$X2=X1,$$

the X1 Feed Factor is set equal to the previously computed Feed Factor:

$$X1=FF,$$

and the average Feed Factor X_Ave for the Make Up region is computed:

$$X\_Ave=(X1+X2+X3+X4)/4.$$

In either case, the Ratio Feed procedure then exits, with the Feed Factor information from the last Feed Cycle having been incorporated into the controller's Feed Factor "database" (i.e., the X and Y values that are stored in the nonvolatile memory).

The computed feed factors X_Ave and Y_Ave are the inverse of the detergent feed rate for the Initial Charge and Make Up regions. The Controller stores the computed feed factor for the last N feed cycles (e.g., the last four Feed Cycles in each of two concentration ranges in the preferred embodiment) in a non-volatile memory, and computes a running average of the N feed factors stored in the non-volatile memory. One of the computed average Feed Factors Y_Ave and X_Ave will be used to compute the feed on time for the next detergent Feed Cycle.

STARTING A NEW FEED CYCLE

If the Ratio Feed procedure is entered with the detergent concentration below the Set Point, the solenoid off and the controller not being in the middle of a Mixing Time loop (steps 270, 290, 291), the Ratio Feed procedure begins a new Feed Cycle at step 310. In addition, a new Feed Cycle is begun at step 310 whenever the previous Feed Cycle results in no change in the detergent concentration (step 301), in which case the X_Ave and Y_Ave Feed Factors are doubled at step 309 before the Ratio Feed procedure begins a new Feed Cycle at step 310.

At step 310, the controller determines whether the Current Concentration (i.e., the concentration at the beginning of the next Feed Cycle), is in the Initial Charge or Make Up regions. If the Current Concentration is not in the Make Up region, at step 311 the Y_Ave Feed Factor is copied into the FFactor variable. If the Current Concentration is in the Make Up region, at step 312 the X_Ave Feed Factor is copied into the FFactor variable.

Next, at step 313 the difference between the Set Point concentration and the current concentration is computed:

$$Diff=Set\ Point-Current\ Concentration$$

and then at step 314 a SolenoidFeedTime is computed by multiplying the concentration difference by the feed factor, FFactor:

$$SolenoidFeedTime=FFactor \times Diff.$$

The process of initiating the next Feed Cycle is completed by resetting the DetergentOnTime counter to zero (step 315), turning on the detergent solenoid (step 316), and copying the Current Concentration into the Old Concentration buffer (step 317). The Ratio Feed procedure then exits.

HANDLING ONGOING FEED CYCLE

As mentioned earlier, if the Current Concentration is less than the Set Point (step 270) and the Solenoid is already on (step 290), this means that the controller is in the midst of a Feed Cycle. The duration of the current Feed Cycle is monitored by the controller by increasing the DetergentOnTime by one (step 320), decreasing the SolenoidFeedTime by one (step 321) and comparing the SolenoidFeedTime with zero (step 322). If the SolenoidFeedTime is not equal to zero, then the Feed Cycle has not yet expired and the Ratio Feed procedure exits. If the SolenoidFeedTime is equal to zero, then the Mixing Time counter is set to 10 or 20 seconds (step 323), the detergent solenoid is turned off (step 324), and the Ratio Feed procedure exits. As explained earlier, the Mixing Time counter is set to 20 seconds if the just completed Feed Cycle was the first detergent Feed Cycle since the Controller was powered on and the detergent concentration at the beginning of the just completed Feed Cycle was in the Initial Charge region, and otherwise it is set to 10 seconds. Step 324 also sets the 1stFeedDone flag, thereby ensuring that subsequent Mixing cycles will be 10 seconds in duration.

DETECTING DETERGENT EXHAUSTION IN DOOR TYPE DISHWASHERS

The typical door type dishwasher has a total wash cycle time of 38 to 45 seconds. When the detergent supply is exhausted, the detergent solution's concentration will drop about ten percent (i.e., or about 2 Beta Units) per wash cycle. As a result, the detergent feed time computed by the Ratio Feed Procedure 166 will increase with each feed cycle. If the detergent supply runs out while the wash tank has a detergent solution at the Set Point, the first two or three subsequent feed cycles will typically be short in duration, allowing two or more feed cycles in a single wash cycle.

Referring to step 257 in FIG. 7, it can be seen that both the A feed cycle counter is incremented for each detergent feed cycle, and that the value of the A counter is copied into the B counter. As a result, if the controller starts, for example, three detergent feed cycles while the detergent solution is in the MakeUp region, and then the detergent solution falls into the Initial Charge region, only two additional feed cycles will be required before the B counter reaches a value of 5.

Referring to FIGS. 6 and 7, the A and B feed cycle counters are updated at the beginning of each mix cycle, just after the end of each detergent feed cycle, while the A and B flags are tested only at the end of the mix cycle. Therefore, if the low detergent concentration causes the Ratio Feed Procedure to use a long detergent feed time (the maximum allowed feed is 26 seconds), the 20 second mixing time will not expire before the dishwasher turns off. In particular, given a detergent feed time in excess of 20 seconds, a power stabilization period of 7 seconds and a mixing time of 20 seconds, the mixing time will not expire until at least 48 seconds after the beginning of the wash cycle. However, wash cycle of door type dishwasher is generally less than 48 seconds. Therefore the B counter will reach a value of 5, but the LowDetergent Flag will not be set before the power to the controller is turned off.

Referring to FIG. 5, step 193 the Main Control program 163 tests the A and B cycle count parameters before executing the main control loop 195 so that a LowDetergent condition in door type dishwashers can be detected early in the wash cycle after the A or B counter reaches a value of 5. In this case, after the 7 second power stabilization period, the Low Detergent sonic alarm and LED are enabled (see step 204), thereby providing a reasonably long sounding of the Low Detergent alarm (typically 33 to 38 seconds) before the wash cycle is completed and the power to the controller is cut off. In this way, the present invention provides a reasonably long sounding of the Low Detergent alarm for door type dishwashers, while still avoiding false alarms by using an mixing time of 20 seconds after first detergent feeds in the Initial Charge region.

ALTERNATE EMBODIMENTS

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

For instance, the present invention could be implemented using a microcontroller having an embedded analog to digital converter, in which case the embedded analog to digital converter will replace the external analog to digital converter used in the preferred embodiments. Similarly, the present invention could equally well be implemented using a digital conductivity sensor that outputs digital conductivity values.

If the number of chemical concentration ranges used by the controller is increased above three, the controller could be adapted to maintain a separate feed count value for each concentration range other than the lowest range (i.e., other than for the Blast Zone). Furthermore, when the feed count for any concentration range is incremented, that feed count will be replicated in the feed count values, if any, for all lower concentration ranges. This replication of feed count values is needed to cumulatively count feed cycles when the concentration value is falling into lower ranges due to exhaustion of the chemical supply.

As mentioned above, the present invention can be used with any type of detergent dispenser that can be turned on and off. The water spraying solenoid type dispenser is just one example of the type of detergent dispenser that can be controlled using the present invention.

The number of times per second that the controller monitors the detergent concentration and updates the controller's status could easily be increased or decreased. The number of different conductivity ranges for which different detergent feed factors are computed and stored could be increased. The number of feed cycles used to "learn" the feed rate of the detergent dispenser could be increased or decreased, and the particular manner in which the feed time for each Feed Cycle is computed could be changed in several different ways without changing the basic control strategy of the present invention. In general, the preferred embodiments represent design choices, while alternate embodiments of the present invention may use the principle of dynamically "learning" and using different detergent feed rate factors in a plurality of conductivity ranges, while making other design choices.

In addition, the multiple-zone feed rate learning procedure and low supply detection procedures could be used in a variety of types of chemical dispenser controllers where the equipment receiving the dispensed chemical is able to measure the concentration or level of the dispensed chemical in the receiving equipment.

What is claimed is:

1. A detergent dispenser controller for use in conjunction with a detergent dispenser that dispenses detergent from a detergent supply into a dishwasher and a conductivity sensor that generates signals corresponding to detergent concentration in a wash tank in the dishwasher, the controller comprising:

a non-volatile memory;

dispenser control circuitry coupled to said detergent dispenser;

an analog to digital converter coupled to said conductivity sensor for converting said conductivity sensor generated signals into digitized conductivity values; and a data processor coupled to said non-volatile memory and said dispenser control circuitry and said analog to digital converter, said data processor including control programming executed by said data processor for:

(A) enabling operation of said detergent dispenser for periods (detergent dispensing periods) of time separated by detergent mixing periods during which operation of said detergent dispenser is disabled;

(B) storing digitized detergent concentration values corresponding to said digitized conductivity values, including digitized detergent concentration values associated with said detergent's concentration before and after each said detergent dispensing period, and computing a first detergent concentration differential value based on said digitized detergent concentrations after and before said chemical dispensing period;

(C) for each of at least a subset of said periods during which said detergent dispenser is enabled, generating a detergent feed factor corresponding to the ratio of each said detergent dispensing period of time to said first detergent concentration differential;

(D) storing said detergent feed factor in said non-volatile memory;

(E) computing an average of said detergent feed factors for a predefined number of said detergent dispenser periods;

(F) computing a second detergent concentration differential value corresponding to a detergent concentration set point and said digitized conductivity value prior to each detergent dispensing period;

(G) computing a feed time value corresponding to said average detergent feed factor and said second detergent concentration differential value;

(H) enabling operation of said detergent dispenser for said computed feed time value; and (I) disabling operation of said detergent dispenser whenever said digitized conductivity value corresponds to a detergent concentration at or above said detergent concentration set point.

2. The detergent dispenser controller of claim 1, further including power supply circuitry for activating the controller only when a wash tank pump in the dishwasher is powered on;

said data processor including means for reading said detergent feed rate factors stored in said non-volatile memory each time said controller is activated.

3. The detergent dispenser controller of claim 1, said data processor being further adapted to determine from said digitized conductivity values a detergent concentration associated with each said generated detergent feed factor, to separately store a plurality of said generated detergent feed factors in said non-volatile memory for each of a plurality of distinct detergent concentration ranges, each said generated detergent feed factor being associated with the one of said distinct detergent concentration ranges corresponding to said determined detergent concentration for that generated detergent feed factor;

to generate a starting detergent concentration value corresponding to said digitized conductivity value prior to each detergent dispensing period;

to compute said average detergent feed factor in accordance with stored detergent feed factors for the one of said distinct detergent concentration ranges in which said starting digitized conductivity value falls; and to compute said feed time value in accordance with said computed average detergent feed factor and said second detergent concentration differential value.

4. The detergent dispenser controller of claim 3, said data processor being further adapted, when said detergent concentration is greater than said threshold level:

to determine from said digitized conductivity values a detergent concentration associated with each said generated detergent feed factor, to separately store a plurality of said generated detergent feed factors in said non-volatile memory for each of a plurality of distinct detergent concentration ranges above said threshold level, each said generated detergent feed factor being associated with the one of said distinct detergent concentration ranges corresponding to said determined detergent concentration for that generated detergent feed factor;

to generate a starting detergent concentration value corresponding to said digitized conductivity value prior to each detergent dispensing period;

to compute said average detergent feed factor in accordance with stored detergent feed factors for the one of said distinct detergent concentration ranges in which said starting digitized conductivity value falls; and to compute said feed time value in accordance with said computed average detergent feed factor and said second detergent concentration differential value.

5. The detergent dispenser controller of claim 3, further including a Low Detergent Warning device for notifying users of said dishwasher that said detergent supply have been exhausted;

said data processor being further adapted:

to establish a store a plurality of feed cycle count values in said nonvolatile memory, including a separate feed cycle count value corresponding to each of said plurality of distinct detergent concentration ranges, to increment, upon concluding each said detergent dispensing period, the feed cycle count value for the one of said distinct detergent concentration ranges associated with said detergent dispensing period by a predefined rule, and to replicate the incremented feed cycle count value in the feed cycle count values, if any, associated with lower detergent concentration ranges than the detergent concentration range for the incremented feed cycle count value;

to reset all of said feed cycle count values to a predetermined starting value whenever said digitized conductivity value corresponds to a detergent concentration at or above said detergent concentration set point; and to enable said Low Detergent Warning device when said feed cycle count value reaches a predefined alarm level.

6. The detergent dispenser controller of claim 1, said data processor being further adapted to determine, before enabling said detergent dispenser, from said digitized conductivity value whether the detergent concentration in said wash tank is less than a threshold level; and when said detergent concentration is less than said threshold level, to enable operation of said detergent dispenser until the first to occur of (A) said detergent concentration in said wash tank exceeds said threshold level and (B) said detergent dispenser has been enabled for a predetermined maximum feed time, and then disabling operation of said detergent dispenser for at least a predefined amount of time.

7. The detergent dispenser controller of claim 6, said data processor being further adapted, when said detergent concentration is greater than said threshold level:

to determine from said digitized conductivity values a detergent concentration associated with each said generated detergent feed factor, to separately store a plurality of said generated detergent feed factors in said non-volatile memory for each of a plurality of distinct detergent concentration ranges above said threshold level, each said generated detergent feed factor being associated with the one of said distinct detergent concentration ranges corresponding to said determined detergent concentration for that generated detergent feed factor;

to generate a starting detergent concentration value corresponding to said digitized conductivity value prior to each detergent dispensing period;

to compute said average detergent feed factor in accordance with stored detergent feed factors for the one of said distinct detergent concentration ranges in which said starting digitized conductivity value falls; and to compute said feed time value in accordance with said computed average detergent feed factor and said second detergent concentration differential value.

8. The detergent dispenser controller of claim 1, further including a Low Detergent Warning device for notifying users of said dishwasher that said detergent supply have been exhausted;

said data processor being further adapted to establish a store a feed cycle count value in said non-volatile memory, to increment said feed cycle count value each time upon concluding each said detergent dispensing period, to reset said feed cycle count value to a predetermined starting value whenever said digitized conductivity value corresponds to a detergent concentration at or above said detergent concentration set point, and to enable said Low Detergent Warning device when said feed cycle count value reaches a predefined alarm level.

9. A method of controlling a detergent dispenser that dispenses detergent from a detergent supply into a dishwasher, wherein the dishwasher includes a conductivity sensor that generates signals corresponding to detergent concentration in a wash tank in the dishwasher, the method comprising the steps of:

converting said conductivity sensor generated signals into digitized conductivity values;

using a programmed digital data processor, performing the steps of:

(A) enabling operation of said detergent dispenser for periods (detergent dispensing periods) of time separated by detergent mixing periods during which operation of said detergent dispenser is disabled;

(B) storing digitized detergent concentration values corresponding to said digitized conductivity values, including digitized detergent concentration values associated with said detergent's concentration before and after each said detergent dispensing period, and computing a first detergent concentration differential value based on said digitized detergent concentrations after and before said chemical dispensing period;

(C) for each of at least a subset of said periods during which said detergent dispenser is enabled, generating a detergent feed factor corresponding to the ratio of each said detergent dispensing period of time to said first detergent concentration differential;

(D) storing said detergent feed factor in a non-volatile memory;

(E) computing an average of said detergent feed factors for a predefined number of said detergent dispenser periods;

(F) computing a second detergent concentration differential value corresponding to a detergent concentration set point and said digitized conductivity value prior to each detergent dispensing period;

(G) computing a feed time value corresponding to said average detergent feed factor and said second detergent concentration differential value;

(H) enabling operation of said detergent dispenser for said computed feed time value; and (I) disabling operation of said detergent dispenser whenever said digitized conductivity value corresponds to a detergent concentration at or above said detergent concentration set point.

10. The method claim 9, said programmed digital data processor further performing the steps of reading said detergent feed rate factors stored in said non-volatile memory each time said dishwasher is powered on.

11. The method of claim 9, said programmed digital data processor further performing the steps of:

determining from said digitized conductivity values a detergent concentration associated with each said generated detergent feed factor, separately storing a plurality of said generated detergent feed factors in said non-volatile memory for each of a plurality of distinct detergent concentration ranges, each said generated detergent feed factor being associated with the one of said distinct detergent concentration ranges corresponding to said determined detergent concentration for that generated detergent feed factor;

generating a starting detergent concentration value corresponding to said digitized conductivity value prior to each detergent dispensing period;

computing said average detergent feed factor in accordance with stored detergent feed factors for the one of said distinct detergent concentration ranges in which said starting digitized conductivity value falls; and computing said feed time value in accordance with said computed average detergent feed factor and said second detergent concentration differential value.

12. The method of claim 11, said programmed digital data processor further performing, when said detergent concentration is greater than said threshold level, the steps of:

determining from said digitized conductivity values a detergent concentration associated with each said generated detergent feed factor, separately storing a plurality of said generated detergent feed factors in said non-volatile memory for each of a plurality of distinct detergent concentration ranges above said threshold level, each said generated detergent feed factor being associated with the one of said distinct detergent concentration ranges corresponding to said determined detergent concentration for that generated detergent feed factor;

generating a starting detergent concentration value corresponding to said digitized conductivity value prior to each detergent dispensing period;

computing said average detergent feed factor in accordance with stored detergent feed factors for the one of said distinct detergent concentration ranges in which said starting digitized conductivity value falls; and computing said feed time value in accordance with said computed average detergent feed factor and said second detergent concentration differential value.

13. The method of claim 11, said programmed digital data processor further performing the steps of:

establishing a store a plurality of feed cycle count values in said nonvolatile memory, including a separate feed cycle count value corresponding to each of said plurality of distinct detergent concentration ranges, incrementing, upon concluding each said detergent dispensing period, the feed cycle count value for the one of said distinct detergent concentration ranges associated with said detergent dispensing period by a predefined rule, and replicating the incremented feed cycle count value in the feed cycle count values, if any, associated with lower detergent concentration ranges than the detergent concentration range for the incremented feed cycle count value;

resetting all of said feed cycle count values to a predetermined starting value whenever said digitized conductivity value corresponds to a detergent concentration at or above said detergent concentration set point; and enabling a Low Detergent Warning device when said feed cycle count value reaches a predefined alarm level.

14. The method of claim 9, said data processor further performing the steps of:

determining, before enabling said detergent dispenser, from said digitized conductivity value whether the detergent concentration in said wash tank is less than a threshold level; and when said detergent concentration is less than said threshold level, enabling operation of said detergent dispenser until the first to occur of (A) said detergent concentration in said wash tank exceeds said threshold level and (B) said detergent dispenser has been enabled for a predetermined maximum feed time, and then disabling operation of said detergent dispenser for at least a predefined amount of time.

15. The method of claim 14, said programmed digital data processor further performing, when said detergent concentration is greater than said threshold level, the steps of:

determining from said digitized conductivity values a detergent concentration associated with each said generated detergent feed factor, separately storing a plurality of said generated detergent feed factors in said non-volatile memory for each of a plurality of distinct detergent concentration ranges above said threshold level, each said generated detergent feed factor being associated with the one of said distinct detergent concentration ranges corresponding to said determined detergent concentration for that generated detergent feed factor;

generating a starting detergent concentration value corresponding to said digitized conductivity value prior to each detergent dispensing period;

computing said average detergent feed factor in accordance with stored detergent feed factors for the one of said distinct detergent concentration ranges in which said starting digitized conductivity value falls; and computing said feed time value in accordance with said computed average detergent feed factor and said second detergent concentration differential value.

16. The method of claim 9, said programmed digital data processor further performing the steps of:

establishing a store a feed cycle count value in said nonvolatile memory, incrementing said feed cycle count value each time upon concluding each said detergent dispensing period, resetting said feed cycle count value to a predetermined starting value whenever said digitized conductivity value corresponds to a detergent concentration at or above said detergent concentration set point, and enabling said Low Detergent Warning device when said feed cycle count value reaches a predefined alarm level.

17. A chemical dispenser controller for use in conjunction with a chemical dispenser that dispenses a chemical into a receiving device and a concentration sensor that generates signals corresponding to said chemical's concentration in the receiving device, the controller comprising:

a non-volatile memory;

dispenser control circuitry coupled to said chemical dispenser;

a signal receiver that receives said concentration sensor generated signals;

a data processor coupled to said non-volatile memory, said dispenser control circuitry and said signal receiver, said data processor including control programming executed by said data processor for:

(A) enabling operation of said chemical dispenser for periods of time (chemical dispensing periods) separated by chemical mixing periods during which operation of said chemical dispenser is disabled;

(B) storing digitized concentration values corresponding to said received concentration sensor generated signals, including digitized concentration values associated with said chemical's concentration before and after each said chemical dispensing period, and computing a first chemical concentration differential value based on said digitized concentrations values after and before said chemical dispensing period;

(C) for each of at least a subset of said chemical dispensing periods, generating a chemical feed factor corresponding to the ratio of each said chemical dispensing period of time to the change, if any, in said chemical concentration during said chemical dispensing period;

(D) storing said chemical feed factor in said non-volatile memory;

(E) computing an average of said chemical feed factors for a predefined number of said chemical dispenser periods;

(F) computing a second chemical concentration differential value corresponding to a chemical concentration set point and said digitized concentration value prior to each chemical dispensing period;

(G) computing a feed time value corresponding to said average chemical feed factor and said second chemical concentration differential value;

(H) enabling operation of said chemical dispenser for said computed feed time value; and (I) disabling operation of said chemical dispenser whenever said digitized concentration value corresponds to a chemical concentration at or above said chemical concentration set point.

18. The chemical dispenser controller of claim 17, further including power supply circuitry for activating the controller only when said receiving device is powered on;

said data processor including means for reading said chemical feed rate factors stored in said non-volatile memory each time said controller is activated.

19. The chemical dispenser controller of claim 17, said data processor being further adapted to determine from said stored digitized concentration values a chemical concentration associated with each said generated chemical feed factor;

to separately store a plurality of said generated chemical feed factors in said non-volatile memory for each of a plurality of distinct chemical concentration ranges, each said generated chemical feed factor being associated with the one of said distinct chemical concentration ranges corresponding to said determined chemical concentration for that generated chemical feed factor;

to generate a starting chemical concentration value corresponding to said digitized concentration value prior to each chemical dispensing period;

to compute said average chemical feed factor in accordance with stored chemical feed factors for the one of said distinct chemical concentration ranges in which said starting digitized concentration value falls; and to compute said feed time value in accordance with said computed average chemical feed factor and said second chemical concentration differential value.

20. The chemical dispenser controller of claim 19, said data processor being further adapted, when said chemical concentration is greater than said threshold level:

to determine from said digitized concentration values a chemical concentration associated with each said generated chemical feed factor, to separately store a plurality of said generated chemical feed factors in said non-volatile memory for each of a plurality of distinct chemical concentration ranges above said threshold level, each said generated chemical feed factor being associated with the one of said distinct chemical concentration ranges corresponding to said determined chemical concentration for that generated chemical feed factor;

to generate a starting chemical concentration value corresponding to said digitized concentration value prior to each chemical dispensing period;

to compute said average chemical feed factor in accordance with stored chemical feed factors for the one of said distinct chemical concentration ranges in which said starting digitized concentration value falls; and to compute said feed time value in accordance with said computed average chemical feed factor and said second chemical concentration differential value.

21. The chemical dispenser controller of claim 19, further including a Low Chemical Warning device for notifying users of said receiving device that said chemical supply have been exhausted;

said data processor being further adapted:

to establish a store a plurality of feed cycle count values in said nonvolatile memory, including a separate feed cycle count value corresponding to each of said plurality of distinct chemical concentration ranges, to increment, upon concluding each said chemical dispensing period, the feed cycle count value for the one of said distinct chemical concentration ranges associated with said chemical dispensing period by a predefined rule, and to replicate the incremented feed cycle count value in the feed cycle count values, if any, associated with lower chemical concentration ranges than the chemical concentration range for the incremented feed cycle count value;

to reset all of said feed cycle count values to a predetermined starting value whenever said digitized concentration value corresponds to a chemical concentration at or above said chemical concentration set point; and to enable said Low Chemical Warning device when said feed cycle count value reaches a predefined alarm level.

22. The chemical dispenser controller of claim 17, said data processor being further adapted to determine, before enabling said chemical dispenser, from said digitized concentration value whether the chemical concentration in said receiving device is less than a threshold level; and when said chemical concentration is less than said threshold level, to enable operation of said chemical dispenser until the first to occur of (A) said chemical concentration in said receiving device exceeds said threshold level and (B) said chemical dispenser has been enabled for a predetermined maximum feed time, and then disabling operation of said chemical dispenser for at least a predefined amount of time.

23. The chemical dispenser controller of claim 22 said data processor being further adapted, when said chemical concentration is greater than said threshold level:

to determine from said digitized concentration values a chemical concentration associated with each said generated chemical feed factor, to separately store a plurality of said generated chemical feed factors in said non-volatile memory for each of a plurality of distinct chemical concentration ranges above said threshold level, each said generated chemical feed factor being associated with the one of said distinct chemical concentration ranges corresponding to said determined chemical concentration for that generated chemical feed factor;

to generate a starting chemical concentration value corresponding to said digitized concentration value prior to each chemical dispensing period;

to compute said average chemical feed factor in accordance with stored chemical feed factors for the one of said distinct chemical concentration ranges in which said starting digitized concentration value falls; and to compute said feed time value in accordance with said computed average chemical feed factor and said second chemical concentration differential value.

24. The chemical dispenser controller of claim 17, further including a Low Chemical Warning device for notifying users of said receiving device that said chemical supply have been exhausted;

said data processor being further adapted to establish a store a feed cycle count value in said nonvolatile memory, to increment said feed cycle count value each time upon concluding each said chemical dispensing period, to reset said feed cycle count value to a predetermined starting value whenever said digitized concentration value corresponds to a chemical concentration at or above said chemical concentration set point, and to enable said Low Chemical Warning device when said feed cycle count value reaches a predefined alarm level.

25. A method of controlling a chemical dispenser that dispenses chemical from a chemical supply into a receiving device, wherein the receiving device includes a concentration sensor that generates signals corresponding to chemical concentration in the receiving device, the method comprising the steps of:

receiving said concentration sensor generated signals;

using a programmed digital data processor, performing the steps of:

(A) enabling operation of said chemical dispenser for periods (chemical dispensing periods) of time separated by chemical mixing periods during which operation of said chemical dispenser is disabled;

(B) storing digitized chemical concentration values corresponding to said received concentration sensor generated signals, including digitized chemical concentration values associated with said chemical's concentration before and after each said chemical dispensing period, and computing a first chemical concentration differential value based on said digitized chemical concentrations after and before said chemical dispensing period;

(C) for each of at least a subset of said periods during which said chemical dispenser is enabled, generating a chemical feed factor corresponding to the ratio of each said chemical dispensing period of time to said first chemical concentration differential;

(D) storing said chemical feed factor in a non-volatile memory;

(E) computing an average of said chemical feed factors for a predefined number of said chemical dispenser periods;

(F) computing a second chemical concentration differential value corresponding to a chemical concentration set point and said digitized concentration value prior to each chemical dispensing period;

(G) computing a feed time value corresponding to said average chemical feed factor and said second chemical concentration differential value;

(H) enabling operation of said chemical dispenser for said computed feed time value; and (I) disabling operation of said chemical dispenser whenever said digitized concentration value corresponds to a chemical concentration at or above said chemical concentration set point.

26. The method claim 25, said programmed digital data processor further performing the steps of reading said chemical feed rate factors stored in said non-volatile memory each time said receiving device is powered on.

27. The method of claim 25, said programmed digital data processor further performing the steps of:

determining from said digitized concentration values a chemical concentration associated with each said generated chemical feed factor, separately storing a plurality of said generated chemical feed factors in said non-volatile memory for each of a plurality of distinct chemical concentration ranges, each said generated chemical feed factor being associated with the one of said distinct chemical concentration ranges corresponding to said determined chemical concentration for that generated chemical feed factor;

generating a starting chemical concentration value corresponding to said digitized concentration value prior to each chemical dispensing period;

computing said average chemical feed factor in accordance with stored chemical feed factors for the one of said distinct chemical concentration ranges in which said starting digitized concentration value falls; and computing said feed time value in accordance with said computed average chemical feed factor and said second chemical concentration differential value.

28. The method of claim 27, said programmed digital data processor further performing, when said chemical concentration is greater than said threshold level, the steps of:

determining from said digitized concentration values a chemical concentration associated with each said generated chemical feed factor, separately storing a plurality of said generated chemical feed factors in said non-volatile memory for each of a plurality of distinct chemical concentration ranges above said threshold level, each said generated chemical feed factor being associated with the one of said distinct chemical concentration ranges corresponding to said determined chemical concentration for that generated chemical feed factor;

generating a starting chemical concentration value corresponding to said digitized concentration value prior to each chemical dispensing period;

computing said average chemical feed factor in accordance with stored chemical feed factors for the one of said distinct chemical concentration ranges in which said starting digitized concentration value fails; and computing said feed time value in accordance with said computed average chemical feed factor and said second chemical concentration differential value.

29. The method of claim 27, said programmed digital data processor further performing the steps of:

establishing a store a plurality of feed cycle count values in said nonvolatile memory, including a separate feed cycle count value corresponding to each of said plurality of distinct chemical concentration ranges, incrementing, upon concluding each said chemical dispensing period, the feed cycle count value for the one of said distinct chemical concentration ranges associated with said chemical dispensing period by a predefined rule, and replicating the incremented feed cycle count value in the feed cycle count values, if any, associated with lower chemical concentration ranges than the chemical concentration range for the incremented feed cycle count value;

resetting all of said feed cycle count values to a predetermined starting value whenever said digitized concentration value corresponds to a chemical concentration at or above said chemical concentration set point; and enabling a Low Chemical Warning device when said feed cycle count value reaches a predefined alarm level.

30. The method of claim 25, said data processor further performing the steps of:

determining, before enabling said chemical dispenser, from said digitized concentration value whether the chemical concentration in said receiving device is less than a threshold level; and when said chemical concentration is less than said threshold level, enabling operation of said chemical dispenser until the first to occur of (A) said chemical concentration in said receiving device exceeds said threshold level and (B) said chemical dispenser has been enabled for a predetermined maximum feed time, and then disabling operation of said chemical dispenser for at least a predefined amount of time.

31. The method of claim 30, said programmed digital data processor further performing, when said chemical concentration is greater than said threshold level, the steps of;

determining from said digitized concentration values a chemical concentration associated with each said generated chemical feed factor, separately storing a plurality of said generated chemical feed factors in said non-volatile memory for each of a plurality of distinct chemical concentration ranges above said threshold level, each said generated chemical feed factor being associated with one of said distinct chemical concentration ranges corresponding to said determined chemical concentration for that generated chemical feed factor;

generating a starting chemical concentration value corresponding to said digitized concentration value prior to each chemical dispensing period;

computing said average chemical feed factor in accordance with stored chemical feed factors for the one of said distinct chemical concentration ranges in which said starting digitized concentration value falls; and computing said feed time value in accordance with said computed average chemical feed factor and said second chemical concentration differential value.

32. The method of claim 25, said programmed digital data processor further performing the steps of:

establishing a store a feed cycle count value in said nonvolatile memory, incrementing said feed cycle count value each time upon concluding each said chemical dispensing period, resetting said feed cycle count value to a predetermined starting value whenever said digitized concentration value corresponds to a chemical concentration at or above said chemical concentration set point, and enabling said Low Chemical Warning device when said feed cycle count value reaches a predefined alarm level.

* * * * *